(12) United States Patent
Kronseder et al.

(10) Patent No.: US 6,174,024 B1
(45) Date of Patent: Jan. 16, 2001

(54) DEVICE FOR ACTUATING A LIFTING AND SLIDING ROOF

(75) Inventors: Robert Kronseder, Hohenpolding; Stefan Miklosi; Jürgen Stenvers, both of München, all of (DE)

(73) Assignee: Webasto Karosseriesysteme GmbH, Stockdorf (DE)

(*) Notice: Under 35 U.S.C. 154(b), the term of this patent shall be extended for 0 days.

(21) Appl. No.: 09/340,116

(22) Filed: Jun. 28, 1999

(30) Foreign Application Priority Data

Jun. 26, 1998 (DE) ............................................. 198 28 464

(51) Int. Cl.⁷ ...................................................... B60J 7/047
(52) U.S. Cl. ...................................... 296/216.03; 296/223
(58) Field of Search ............................... 296/216.03, 223, 296/216.02

(56) References Cited

U.S. PATENT DOCUMENTS 5,066,068 * 11/1991 Suzuki et al. ........................ 296/221

FOREIGN PATENT DOCUMENTS

3737725 * 12/1988 (DE) ...................................... 296/223
41 01 288     7/1991 (DE) ................................ 296/216.03

* cited by examiner

*Primary Examiner*—Dennis H. Pedder
(74) *Attorney, Agent, or Firm*—Nixon Peabody LLP; David S. Saffran

(57) ABSTRACT

The invention relates to a device for actuating a lifting and sliding roof with a cover (13) which is joined to a cover rocker arm (4) which has at least one guideway (6A; 6B) and into which a raising mechanism for lifting the rear edge (13B) of the cover fits, and which can be displaced by means of a rack/pinion connection to the rear over the fixed roof (14) of a motor vehicle. For stabile, rattle-free guidance of the cover (13), the raising mechanism is provided with a raising lever (3), one end of which is supported with a pivot axle (2) to pivot on a roof-mounted part (1) and on its other end there are two guide elements (3A, 3B) which are at different distances from the pivot axle (2) and which each fit into a guideway (6A, 6B) of the cover rocker arm (4), the guideways being of different slopes.

19 Claims, 3 Drawing Sheets

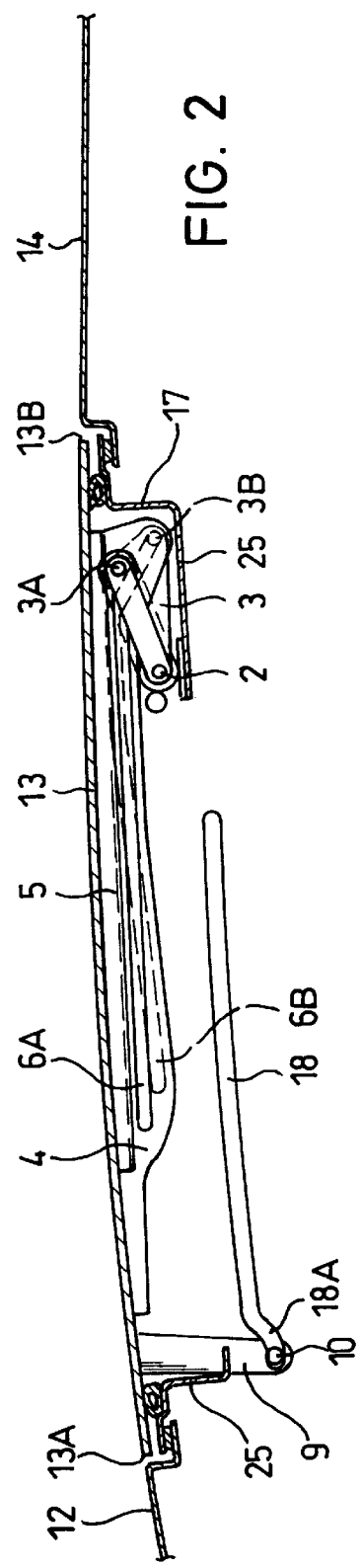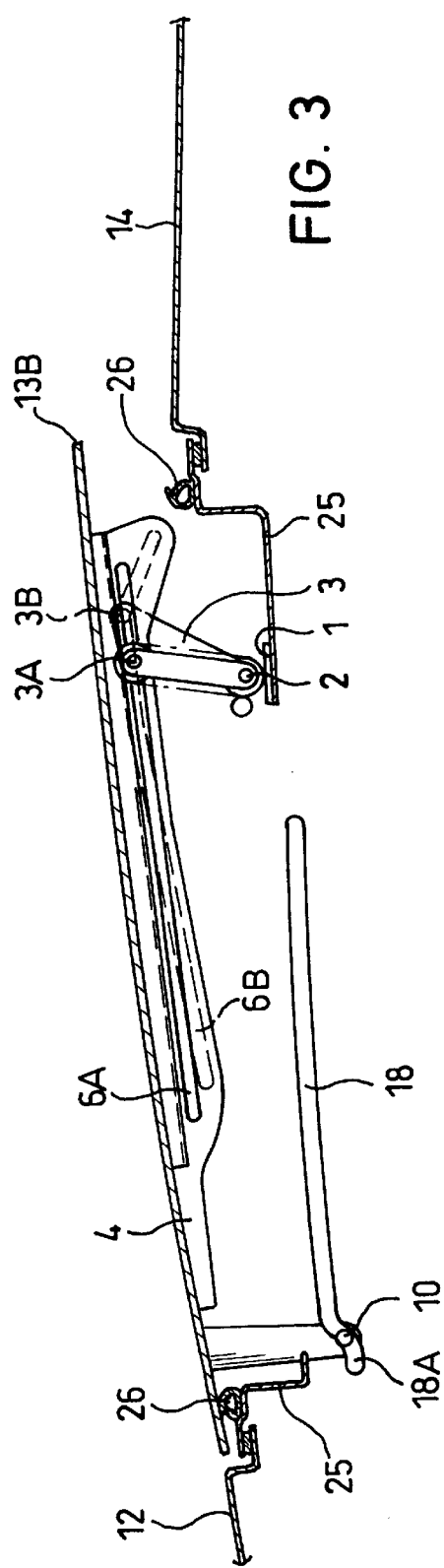

DEVICE FOR ACTUATING A LIFTING AND SLIDING ROOF

BACKGROUND OF THE INVENTION

1. Field of the Invention

The invention relates to a device for actuating a lifting and sliding roof with a cover which is joined to a cover rocker arm which has at least one guideway and into which a raising mechanism for lifting the rear edge of the cover fits, and which can be displaced to the rear over the roof of a motor vehicle by means of a rack/pinion connection.

2. Description of Related Art

In a device for actuating a lifting and sliding roof or a spoiler roof which is known from published German patent application DE 41 01 288 A1, a pinion which is supported on a raising lever fits into a rack which is connected to the cover, by which the cover is raised in a first phase of motion, and in a second phase, the cover is pushed to the rear over the fixed roof. Because the rack and pinion form the sole engagement for guiding the cover in its rear area, such a roof tends to rattle as a result of the required play between the rack and pinion.

SUMMARY OF THE INVENTION

The primary object of this invention is to devise a device for actuating a lifting and sliding roof which enables secure, rattle-free guidance of the cover.

This object is achieved in accordance with this invention by the raising mechanism having a raising lever with one end which is supported with a pivot axle to pivot on a roof-mounted part and there being two guide elements by on its other end which have a different distance from the pivot axle and which each fit into a guideway of the cover rocker arm, a guideway of varying slope.

The fitting of the two guide elements into guideways of the cover rocker arm, guideways of varying slope, guarantees secure engagement between the raising mechanism and the cover, and on the other hand, the varying incline of the guideways also enables a different raising angle of the cover into the various operating positions.

For actuation in the displacement direction, preferably at least one pinion, which is connected to a drive and which engages a rack supported on the cover, is supported on the raising lever.

For symmetrical application of force between the raising lever and the cover, it is advantageous if the raising lever is made as a forked lever with two arms which are spaced apart from one another. In this case, the guide elements are each located preferably on the outsides of the arms.

Then, preferably, the pinion or pinions are supported between the arms of the raising lever for fitting into the roof-mounted rack. Preferably, there are two pinions in a coaxial arrangement, of which each engages a rack.

Between the pinions, there is preferably an upper drive wheel which is drive-connected to them.

So that the drive need not be located on a part which pivots at the same time, as in the prior art cited initially, as in published German patent application DE 41 01 288 A1, in this invention, it is preferably provided that the upper drive wheel is connected by force-fit to a lower drive wheel which is located in the area of the pivot axle of the raising lever. Thus, the drive forces can be applied in the area of the pivot axle of the raising lever which remains stationary. The upper and lower drive wheel are connected preferably by a toothed belt.

Preferably, there is a single device with a raising mechanism in the area of the central longitudinal axis of the cover. If the drive forces must be transmitted to the rear by means of another toothed belt from a crank located in the front area of the roof to the raising mechanism, in the area of the central longitudinal axis, advantageously there is a strut of the roof frame. But, alternatively, it is also likewise equally possible to drive the raising and pushing device from the rear part of the roof, and then a center strut can be eliminated. According to another alternative, it is also possible to provide two raising mechanisms on either side of the rear edge of the cover, their having either two guide elements each for engagement with the guideways of the cover rocker arm which have differing slopes, or the raising mechanism to one side of the rear edge of the cover having only a single guide element and the cover rocker arms on either side of the cover being equipped with one guideway each of differing slope.

Finally, it is preferably provided that the cover with the guide elements is guided near its front edge in roof-mounted lateral guides which have a sunken path segment in the front area. Because the guide elements run onto the rear part of the guide which is higher relative to the sunken path segment when the cover is shifted to the rear, a flatter slope of the cover is engendered, causing less resistance to the relative wind.

In the following one embodiment of the invention is described using the drawings.

BRIEF DESCRIPTION OF THE DRAWINGS

FIG. 2 is a longitudinal section through the motor vehicle roof in the closed position;

FIG. 3 is a longitudinal section through the roof with the rear edge of the cover raised;

DETAILED DESCRIPTION OF THE INVENTION

Figure 1:
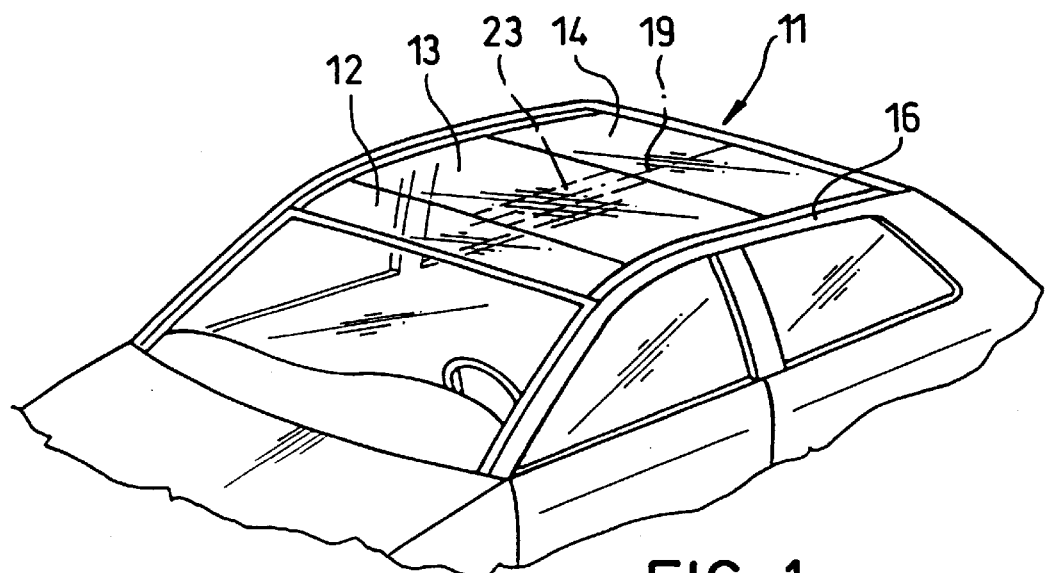
FIG. 1 is a schematic perspective of a motor vehicle roof.

The motor vehicle roof 11 shown in FIG. 1 has a fixed front roof section 12, a fixed rear roof section 14 and a lifting and sliding roof or spoiler roof located in between with a cover 13. The roof is bounded to both sides by side struts 16. In the area of the central longitudinal axis 19 of the roof, a center strut 23 is optionally indicated by dot-dash lines; it is necessary when the raising mechanism of the cover 13 (described below) is located in a central position underneath the rear edge of the cover 13 and in addition is connected to a crank via a drive connection, for example, a toothed belt, the crank being located underneath the front fixed roof part 12. In this case, the center strut 23 is needed to cover the drive connection. If the raising mechanism is driven directly from the area of the rear fixed roof 14, this center strut 23 is superfluous.

The cover 13 is connected on its bottom to a cover rocker arm 4 which is located either in the central position in the area of the central longitudinal axis 19, or it can also be located alternatively thereto on either/both side(s) of the cover 13. The embodiment described below relates to a two-part cover rocker arm 4 which is located in the center area of the cover 13. The cover rocker arm 4 has two guideways 6A and 6B which have different slopes. While the guideway 6A runs straight, the guideway 6B has a path segment in the rear area of the cover which is angled downward obliquely to the rear and connects to the front with a path segment which is parallel to the straight guideway 6A, and finally further forward is a path section which is sloped obliquely downward to the front.

Figure 5:
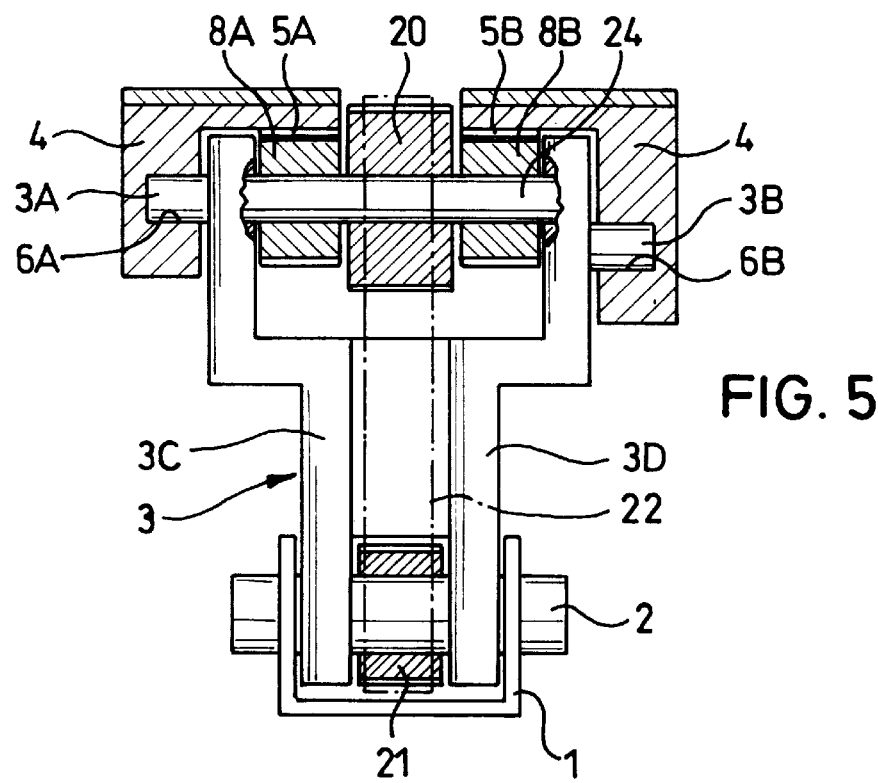
FIG. 5 shows a section through the raising mechanism along the section line V—V in FIG. 4.

Guide elements which are made as pins 3A and 3B fit into these guideways 6A and 6B. The pins 3A and 3B are located on either side of a raising lever 3 which, as shown in FIG. 5, is made as a forked lever with two arms 3C and 3D, the arm 3C, which is the left one in FIG. 5, carrying the pin 3A on its outer side and the arm 3D, which is located on the right side in FIG. 5, carrying the pin 3B on its outer side. In the lower area, the raising lever 3 is supported on a pillow block 1 which is mounted on the roof frame by means of a pivot axle 2.

The pivot axle 2, which is used to support the raising lever 3 on the pillow block 1, is also used, at the same time, as the drive shaft for a lower drive wheel 21 which is connected to the pivot axle 2 so as to rotate with it and which is located between the arms 3C and 3D of the raising lever 3 (FIG. 5). The lower drive wheel 21 is connected via a toothed belt 22 to an upper drive wheel 20 which is connected to rotate with a shaft 24 which is supported in the upper area between the arms 3C and 3D of the drive lever 3. On each side of the upper drive wheel 20, one of two pinions 8A and 8B sit between it and one of the arms 3C and 3D of the drive lever 3. Each of the arms 8A, 8B is engaged with a respective one of the racks 5A and 5B which are mounted on the cover. The racks 5A and 5B can be joined, e.g., cemented, directly to the bottom of the cover 13 or, as shown in FIG. 5, can be made directly as part of the cover rocker arms 4, or they can be attached to them.

Thus, the drive forces for actuating the raising and pushing mechanism(not shown) via a pinion, and which is located on the pivot axle 2, are applied to the lower drive wheel 21, transferred by the toothed belt 22 to the upper drive wheel 20, and from there they are relayed via the shaft 24 and the pinions 8A and 8B to the racks 5A and 5B. In place of a rack, for example, an electric drive which is supported in the rear area on the roof frame 25 can directly engage the pivot axle 2.

The cover 13 is guided in the area of its front edge 13A on either side by means of a front cover support 9 and guide elements 10 which are located thereon in a guideway 18 which is located on either side of the cover on the roof frame 25 and which has a sunken path segment 18A in the front area.

In the closed position, as shown in FIG. 2, the guide element 10 is located on the front end of the sunken path segment 18A. In this position (FIG. 2), the raising lever 3 is deposited to the rear. In the raising motion of the rear edge 13B of the cover, as shown in FIG. 3, the raising lever 3 is raised counterclockwise by applying drive forces via the pivot axle 2, the lower drive wheel 21, the toothed belt 22, the upper drive wheel 20, and the pinions 8A, 8B to the racks 5A and 5B. In doing so, the pin 3B drifts from the back end of the guideway 6B, via the path segment which is sloped obliquely downward to the rear, into the path segment of guideway 6B which is located parallel to the guideway 6A. The pin 6A then moves forward analogously thereto in the guideway 6A. The front guide element 10 moves slightly away from the sunken path segment 18A in the area of its ramp which rises obliquely rearward towards the straight guideway segment 18. The cover 13, in doing so, reaches its maximum oblique position so that, in the subsequent displacement of the cover 13, the back end of the cover rocker arm 4 is guided rearward via a seal 26 in the rear area of the roof frame 25.

Figure 4:
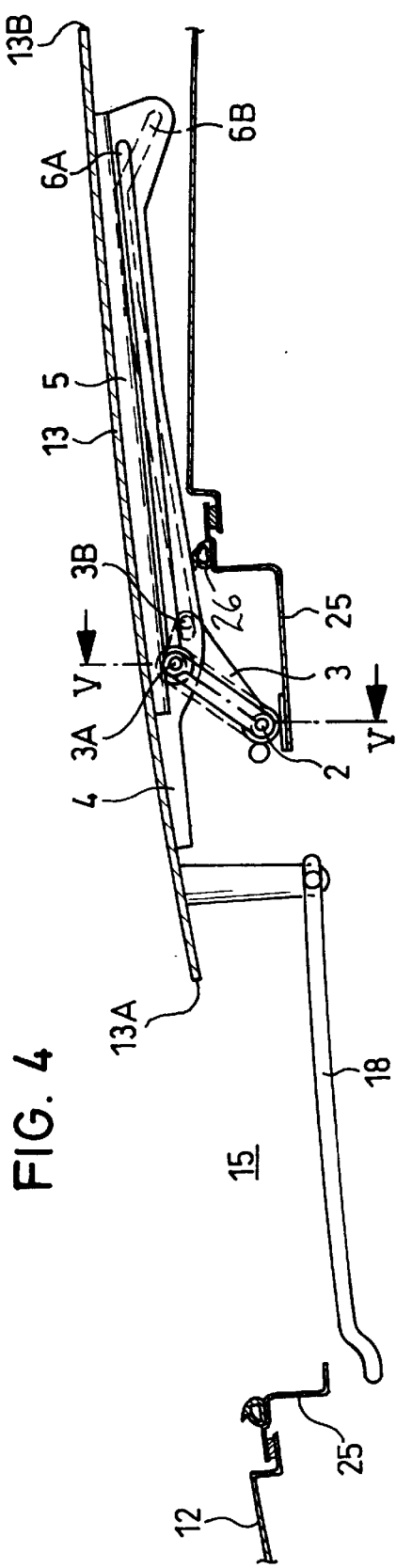
FIG. 4 is a longitudinal section through the roof with the cover shifted to the rear.

FIG. 4 shows the cover 13 in its position which is pushed as far as possible to the rear. Here, a large part of the roof opening 15 is exposed. In this process, the pins 3A and 3B have drifted towards the front end of the guideways 6A and 6B and the guide element 10 has drifted in the straight part of the guideway 18 towards its back end. Due to the path segment of the guideway 6B which drops obliquely forward and due to the rise of the guide element 10 from the sunken path segment 18A into the straight path segment 18, in the position pushed to the rear, the cover has a flatter slope than in the raised position as shown in FIG. 3. In this way, the wind forces which engage the cover 13 are reduced.

We claim:

1. Device for actuating a lifting and sliding roof having a cover which is joined to a cover rocker arm which has a pair of guideways into which a raising mechanism for lifting the rear edge of the cover fits, and which can be displaced rearward over a fixed roof of a motor vehicle by means of a rack and pinion connection; wherein the raising mechanism has a raising lever with a first end which is supported by a pivot axle so as to pivot on a roof-mounted part and a second end with two guide elements which are different distances from the pivot axle and each of which fits into a respective one of the guideways of the cover rocker arm; and wherein each of the guideways has a different slope.

2. Device as claimed in claim 1, wherein at least one pinion is connected to a drive and engages a rack supported on the cover; said at least one pinion being supported on the raising lever.

3. Device as claimed in claim 2, wherein the raising lever is a forked lever with two arms which are spaced apart from one another.

4. Device as claimed in claim 3, wherein one of said guide elements is provided on an outer side of each of the arms of the forked lever.

5. Device as claimed in claim 4, wherein the at least one pinion is supported between the arms of the forked lever.

6. Device as claimed in claim 5, wherein the at least one pinion comprises two pinions in a coaxial arrangement; and wherein each of the pinions engages a respective rack on the cover.

7. Device as claimed in claim 6, wherein an upper drive wheel is provided between the pinions, said upper drive wheel being drive-connected to the pinions.

8. Device as claimed in claim 7, wherein the upper drive wheel is drivingly connected to a lower drive wheel which is located in an area of the pivot axle of the raising lever.

9. Device as claimed in claim 8, wherein the drive wheels are connected by means of a toothed belt.

10. Device as claimed in claim 1, wherein the raising mechanism is in an area of the central longitudinal axis of the cover.

11. Device as claimed in claim 1, wherein the cover is guided near a front edge thereof in roof-mounted guides of the guide elements which have a sunken path segment at a front end area thereof.

12. Device as claimed in claim 1, wherein the raising lever is a forked lever with two arms which are spaced apart from one another.

13. Device as claimed in claim 1, wherein the raising lever is a forked lever with two arms which are spaced apart from one another.

14. Device as claimed in claim 13, wherein one of said guide elements is provided on an outer side of each of the arms of the forked lever.

15. Device as claimed in claim 14, wherein at least one pinion is supported between the arms of the forked lever.

16. Device as claimed in claim 15, wherein the at least one pinion comprises two pinions in a coaxial arrangement; and wherein each of the pinions engages a respective rack on the cover.

17. Device as claimed in claim 16, wherein an upper drive wheel is provided between the pinions, said upper drive wheel being drive-connected to the pinions.

18. Device as claimed in claim 17, wherein the upper drive wheel is drivingly connected to a lower drive wheel which is located in an area of the pivot axle of the raising lever.

19. Device as claimed in claim 18, wherein the drive wheels are connected by means of a toothed belt.

\* \* \* \* \*